UNITED STATES PATENT OFFICE.

CHARLES A. CATLIN, OF PROVIDENCE, RHODE ISLAND.

BAKING-POWDER.

SPECIFICATION forming part of Letters Patent No. 238,570, dated March 8, 1881.

Application filed November 3, 1880. (Specimens.)

*To all whom it may concern:*

Be it known that I, CHARLES A. CATLIN, of the city and county of Providence, Rhode Island, have invented a new and useful Improvement in Yeast or Baking-Powders, which improvement is fully set forth in the following specification.

This invention has general reference to the compounds known as "yeast," or "baking-powder," consisting of an acid or acid-salt mixed with proper proportions of a carbonate or bicarbonate, for use in bread-making, in order to attain an evolution of carbonic acid within the dough by the action of the acid or acid-salt upon the carbonate or bicarbonate. Various acids and acid-salts have heretofore been used, the most common being tartaric acid, free or combined with potassa, in the form of a bitartrate (cream of tartar,) acid phosphates, and alum. The last named, alum, on account of its low cost and superior keeping quality in admixture with a carbonate, seems pre-eminently adapted to the purpose, and would doubtless be universally employed were it not that its use is attended by the introduction into the bread or food of a popularly-supposed injurious or unhealthful element. Ammonia alum is found to have advantages over the other common alum, as possessing a greater acid strength, and also on account of the evolution of ammonia as well as carbonic acid—greater bread-raising powers.

The present invention has for its object to provide a material or preparation that may be used in the compositions of baking-powders, and which will possess the valuable keeping qualities of alum without its objectionable properties due to the aluminium compound contained therein, and it is based upon the application to this purpose of the sulphate of ammonium, which possesses the property of decomposing alkaline bicarbonates and of liberating from them, on the application of heat, the greater part of their carbonic acid. The sulphate of ammonium can be used alone; but practically it is found advantageous to unite it with the sulphate of magnesium, either in the form of a double sulphate of ammonium and magnesium, or by simple admixture of the two sulphates. The double salt is preferred, and usually it is also desirable to have with the said double salt an excess of the sulphate of magnesium. The preparations containing sulphate of ammonium can be used without other acid agent in the baking-powder; but being, when dried, practically as inert as starch, and yet contributing to the effective strength of the baking-powder, they find their most efficient and acceptable use in connection with cream of tartar or its substitute—acid phosphate, for example. They are for this purpose preferably made with a certain proportion of starch.

The general principles of the invention having been indicated, the manner in which it is or may be carried into effect will now be described, and to this end a process for making baking-powder with an ammonia preparation, cream of tartar, or its substitute, and alkaline bicarbonate, will first be explained, a baking-powder of this description possessing excellent keeping and bread-raising qualities.

Sulphate of ammonium of commerce (usually containing about twenty-five per cent. of ammonia) is dissolved in boiling water, in the proportion of thirty pounds of the sulphate to five gallons of water, and while the solution is still hot it is filtered to remove insoluble impurities. To the resulting clear solution is added gradually, with stirring, sulphate of magnesium (ninety pounds) in fine crystals. A thin mush is thus formed, and with it starch (sixty pounds) is intimately mixed. The result is a plastic mass, which is spread upon a dry floor, and in a few days becomes dry and crystalline. The dry material is broken up into small granules by grating it through a coarse wire sieve, and then dried by hot air and ground to a powder. This dry powder is mixed with cream of tartar or its substitute of like strength in the proportion of, say, one of the powder to two of the cream of tartar. This proportion can be increased or diminished, if desired. Twenty (20) parts of the mixture thus made will decompose eight (8) parts of bicarbonate of sodium. The baking-powder obtained by mixing these materials in the proportions indicated is superior to one containing twenty (20) parts of cream of tartar and nine (9) parts of bicarbonate of soda. The raising effect is greater on account of the ammonia, although less bicarbonate is used.

It will be seen from the above that by the use in baking-powders of the compound or preparation described, a very large amount of diluent may be introduced without impairing the baking value of the article. Its keeping qualities will be thus increased, and at the same time its cost reduced, and the results named are accomplished without introducing into the food prepared with said compound any unhealthy or injurious agent, as some authorities claim to be the case when alum in any form is used.

The sulphate of ammonium can be used without the sulphate of magnesium; but as pointed out in the first part of the specification, it is better to combine or mix it with the latter salt. The plan usually adopted is to prepare a double salt by adding gradually to the required amount of sulphate of ammonium dissolved in the least possible quantity of boiling water, the crystallized sulphate of magnesium, which dissolves to a certain extent in the solution of sulphate of ammonium, then to add the amount of sulphate of magnesium necessary to give the desired excess, and after allowing the whole to stand several days and crystallize together, to drive off the water from the crystalline body, as in the case of magnesium sulphate alone. This plan is substantially pursued in the example first given; but in it starch is added the better to fit the material for use in connection with cream of tartar or its substitute.

If it is desired to employ the material by itself, it is when reduced to a powder to be mixed with the proper equivalent of alkaline bicarbonate. In this case, also, starch can be used, if desired.

The present invention, therefore, comprises the application of sulphate of ammonium, or preparations containing the same, as an entire or partial substitute for cream of tartar or similar acid agent, such as the acid phosphates heretofore used in admixture with alkaline carbonates in effervescent powders for baking and other purposes, and includes the acid preparations free from the injurious elements of alum, and containing the sulphate of ammonium, as aforesaid, with or without cream of tartar or its equivalent, and with or without starch or other diluent and baking-powders made with any of said preparations.

The sulphate of magnesium as a cream of tartar substitute in baking or effervescent powders is not claimed, broadly, herein, but forms the subject-matter of a separate application for Letters Patent.

Having thus explained the said invention and the manner of carrying the same into effect, what I claim is—

1. A cream of tartar substitute, as described, being a pulverulent preparation free from aluminium compounds and containing as an active ingredient sulphate of ammonium, substantially as set forth.

2. A baking or effervescent powder comprising, in admixture with alkaline carbonate, a pulverulent preparation, substantially as described, the said preparation containing as an active ingredient sulphate of ammonium, and being free from aluminium compounds, as set forth.

In testimony whereof I have signed this specification in the presence of two subscribing witnesses.

CHAS. A. CATLIN.

Witnesses:
BENJN. N. LAPHAM,
JOHN J. ARNOLD.